(12) United States Patent
Nishimura

(10) Patent No.: US 7,213,574 B2
(45) Date of Patent: May 8, 2007

(54) CONTROL DEVICE FOR INTERNAL COMBUSTION ENGINE

(75) Inventor: Taichi Nishimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/366,770

(22) Filed: Mar. 3, 2006

(65) Prior Publication Data

US 2006/0207565 A1 Sep. 21, 2006

(30) Foreign Application Priority Data

Mar. 18, 2005 (JP) ............................. 2005-078324

(51) Int. Cl.
*F02D 41/30* (2006.01)
*B60W 10/06* (2006.01)
(52) U.S. Cl. .................. 123/431; 123/478; 477/54
(58) Field of Classification Search ............... 123/299, 123/300, 431, 457, 478, 480; 477/54; 701/104
See application file for complete search history.

(56) References Cited

U.S. PATENT DOCUMENTS

| 5,975,056 | A | 11/1999 | Augustin et al. |
| 6,298,830 | B1 * | 10/2001 | Kono ................... 123/478 |
| 6,311,669 | B1 * | 11/2001 | Przymusinski et al. ..... 123/300 |
| 6,508,233 | B1 * | 1/2003 | Suhre et al. .............. 123/478 |
| 6,513,485 | B2 * | 2/2003 | Ogawa et al. ............. 123/295 |
| 6,729,297 | B2 * | 5/2004 | Futonagane et al. ....... 123/299 |
| 2004/0007209 | A1 | 1/2004 | Ohtani |
| 2006/0016431 | A1 | 1/2006 | Mashiki et al. |
| 2006/0207241 | A1 * | 9/2006 | Araki et al. ............... 60/284 |

FOREIGN PATENT DOCUMENTS

| DE | 197 00 738 C1 | 4/1998 |
| JP | A 03-185242 | 8/1991 |
| JP | A 07-103050 | 4/1995 |
| JP | A 07-103051 | 4/1995 |
| JP | A 10-018884 | 1/1998 |
| JP | A 11-351041 | 12/1999 |
| JP | A 2004-27910 | 1/2004 |

* cited by examiner

*Primary Examiner*—T. M. Argenbright
(74) *Attorney, Agent, or Firm*—Oliff & Berridge PLC

(57) ABSTRACT

An engine ECU executes a program including the steps of: detecting a fuel pressure in a high-pressure fuel system (S130) if a lock-up clutch is not in a released state (NO at S100) and if a tip end temperature of an in-cylinder injector is equal to or lower than a temperature threshold value (NO at S120); calculating fuel pressure lowering ΔP as a result of fuel injection from the in-cylinder injector (S140); calculating fuel shortage amount ΔQ corresponding to fuel pressure lowering shortage (S170) if ΔP is smaller than a fuel pressure threshold (YES at S150); and injecting fuel from an intake manifold injector in an amount obtained by adding ΔQ to an amount of fuel injection from the intake manifold injector of a cylinder (S180).

14 Claims, 7 Drawing Sheets

F I G. 2
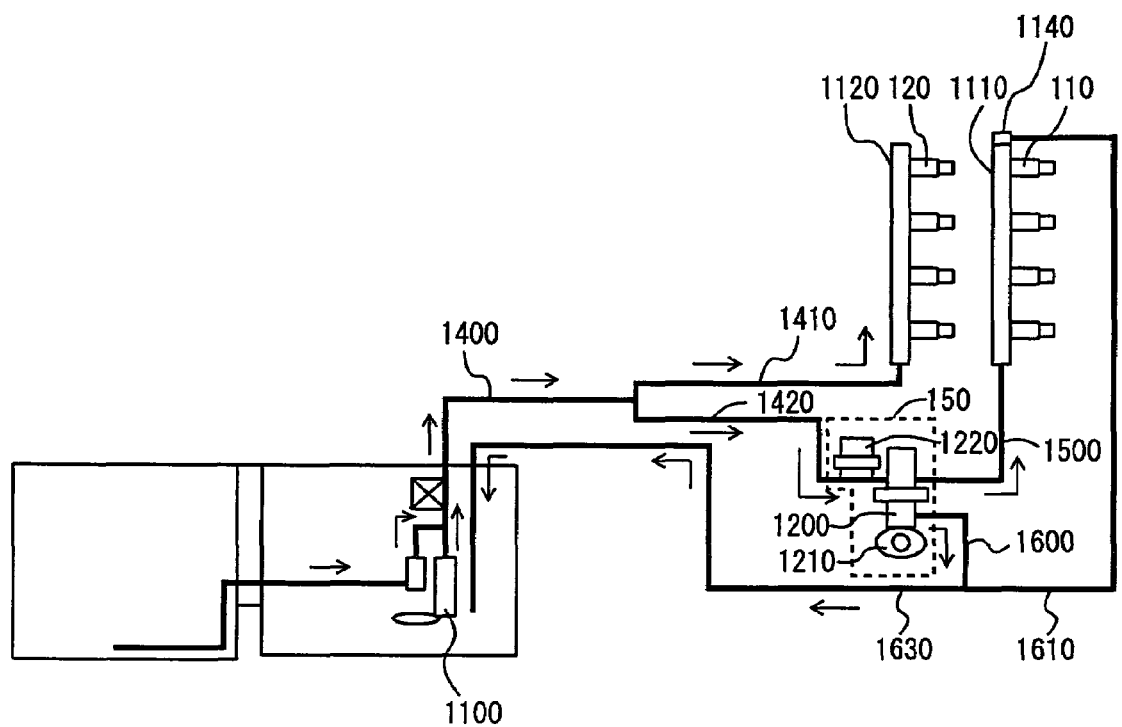

CONTROL DEVICE FOR INTERNAL COMBUSTION ENGINE

This nonprovisional application is based on Japanese Patent Application No. 2005-078324 filed with the Japan Patent Office on Mar. 18, 2005, the entire contents of which are hereby incorporated by reference.

BACKGROUND OF THE INVENTION

1. Field of the Invention

The present invention relates to an internal combustion engine for a vehicle, and more particularly to a control device for an internal combustion engine that includes a first fuel injection mechanism (in-cylinder injector) injecting fuel into a cylinder and a second fuel injection mechanism (intake manifold injector) injecting fuel into an intake manifold or an intake port.

2. Description of the Background Art

An internal combustion engine provided with an intake manifold injector for injecting fuel into an intake manifold and an in-cylinder injector for injecting fuel into a combustion chamber, in which fuel injection from the intake manifold injector is stopped when load of the engine is lower than preset load and fuel injection from the intake manifold injector is allowed when load of the engine is higher than the preset load, is known. Generally, such an internal combustion engine includes an intake manifold injector and an in-cylinder injector in each cylinder.

Though different from the internal combustion engine having such two types of injectors, there is an internal combustion engine in which fuel injection into each cylinder is performed twice prior to one expansion stroke. For example, there is a diesel engine in which a small amount of fuel is supplied to a combustion chamber in pilot injection prior to main fuel injection and the fuel injected in pilot injection is burnt prior to main fuel injection, so that ignition delay of the fuel injected in main fuel injection is decreased, thereby preventing increase in combustion noise (knocking noise) of the internal combustion engine. A control device for such a diesel engine is represented by a fuel injection control device disclosed in Japanese Patent Laying-Open No. 2004-27910. A fuel injection apparatus includes an accumulator for storing a high-pressure fuel and a fuel injection valve connected to the accumulator and injecting the fuel stored in the accumulator into the combustion chamber of the internal combustion engine, and pilot injection from the fuel injection valve is performed prior to main fuel injection. A fuel injection control device includes pulsation detection means for detecting fluctuation in a pressure of fuel supplied to the fuel injection valve that is caused by pilot injection and correction means for calculating variation in fuel injection performance of the fuel injection valve in pilot injection based on fluctuation in the pressure and correcting an amount of fuel injection in pilot injection based on variation in the fuel injection performance such that an actual fuel injection amount in next pilot injection attains a target pilot injection amount. The correction means corrects an amount of fuel injection in main fuel injection based on calculated variation in the pilot injection performance such that an actual fuel injection amount in main fuel injection attains a target main fuel injection amount.

According to the fuel injection control device, in what is called a common rail type fuel injection apparatus including an accumulator (common rail) storing high-pressure fuel, fluctuation in the fuel pressure involved in pilot injection is detected, and variation in the fuel injection performance of each fuel injection valve during pilot fuel injection is calculated based on detected pressure fluctuation. For example, when pilot injection is performed, the pressure of fuel within a system fluctuates depending on an amount of fuel injection. Accordingly, if the amount of pilot fuel injection is reduced due to wear of a valve seat or the like, magnitude of fuel pressure fluctuation within the system at the time of pilot fuel injection is also made smaller. Therefore, variation in the fuel injection performance such as the amount of fuel injection can thus be calculated based on fluctuation in the fuel pressure during pilot fuel injection, and an injection instruction signal is corrected so as to increase an actual fuel injection amount by that variation (lowered amount), whereby the actual pilot fuel injection amount can accurately attain the target value. In addition, the amount of fuel injection is corrected also in main fuel injection, so as to further ensure prevention of deterioration in exhaust performance or generation of smoke.

The fuel injection valve provided in each cylinder and injecting fuel into the cylinder, as disclosed in Japanese Patent Laying-Open No. 2004-27910, is used to perform pilot injection and main fuel injection. The fuel injection valve injecting fuel into the cylinder, however, is provided in such a manner that its tip end projects within the combustion chamber. Accordingly, deposits may adhere to an injection hole and the fuel may not properly be injected. In such a case, a desired amount of fuel can be injected neither in pilot injection nor in main fuel injection disclosed in Japanese Patent Laying-Open No. 2004-27910, and the internal combustion engine cannot exhibit desired performance.

SUMMARY OF THE INVENTION

An object of the present invention is to provide a control device for an internal combustion engine including a first fuel injection mechanism for injecting fuel into a cylinder and a second fuel injection mechanism for injecting fuel into an intake manifold, capable of solving a problem with regard to fuel injection from the first fuel injection mechanism, without lowering performance of the internal combustion engine.

A control device for an internal combustion engine according to the present invention controls an internal combustion engine including a first fuel injection mechanism injecting fuel into a cylinder and a second fuel injection mechanism injecting fuel into an intake manifold for each cylinder. The control device includes: a control unit controlling the fuel injection mechanism for each cylinder, such that the fuel is injected from the first fuel injection mechanism and the second fuel injection mechanism at a ratio set therebetween based on a condition requested in the internal combustion engine; a detection unit detecting for each cylinder that an amount of fuel injected from the first fuel injection mechanism is smaller than an amount requested in the first fuel injection mechanism; and a corrective control unit controlling the second fuel injection mechanism such that an amount of fuel injected from the second fuel injection mechanism in a cylinder in which the amount of injected fuel is smaller than the requested amount is increased.

According to the present invention, for example, the in-cylinder injector representing one example of the first fuel injection mechanism has an injection hole provided at its tip end, the injection hole being a small hole through which the fuel is injected and being exposed in the cylinder. Accordingly, adhesive substance (deposits) may adhere to (be deposited in or generated in) the injection hole under high-temperature atmosphere. If deposits are generated in such a manner, fuel injection of a desired amount cannot be carried out. If fuel injection of a desired amount from the in-cylinder injector cannot be carried out, the detection unit detects, for example, that the amount of fuel injected from the in-cylinder injector is smaller than the amount requested in the in-cylinder injector, because the pressure of fuel within the high-pressure delivery pipe for supplying the fuel to the in-cylinder injector is not considerably lowered. In such a case, the amount of fuel injected from the in-cylinder injector is insufficient, and an air-fuel mixture within the combustion chamber becomes lean. Then, a spray angle of the fuel injected from the in-cylinder injector is made narrower due to deposits, which results in poorer homogeneity of the air-fuel mixture and poorer drivability. Accordingly, the fuel is injected from the intake manifold injector representing one example of the second fuel injection mechanism, in order to compensate for shortage of fuel injection by the in-cylinder injector. As such, a desired, requested amount of fuel can be ensured and homogeneity of the fuel injected into the intake manifold is favorable, whereby lowering in performance of the internal combustion engine is avoided. Consequently, a control device for an internal combustion engine including a first fuel injection mechanism for injecting fuel into a cylinder and a second fuel injection mechanism for injecting fuel into an intake manifold, capable of solving a problem with regard to fuel injection from the first fuel injection mechanism, without lowering performance of the internal combustion engine, can be provided.

Preferably, the detection unit detects a pressure of fuel supplied to the first fuel injection mechanism, and detects that the amount of injected fuel is smaller than the requested amount when an amount of pressure lowering as a result of fuel injection from the first fuel injection mechanism is smaller than a predetermined threshold.

According to the present invention, when a desired amount of fuel is injected from the in-cylinder injector, a pressure of fuel in a pipe for supplying the fuel to the in-cylinder injector is lowered in accordance with the amount of injected fuel. Determining that sufficient fuel was not injected if pressure lowering is small (the amount of pressure lowering is smaller than the predetermined threshold), the detection unit can detect that the amount of injected fuel is smaller than the requested amount.

Preferably, the corrective control unit calculates an amount of fuel shortage representing a difference between the requested amount and the amount of fuel injected from the first fuel injection mechanism based on the threshold and the amount of pressure lowering, and increases an amount of fuel injection by adding the amount of fuel injected from the second fuel injection mechanism based on the amount of fuel shortage.

According to the present invention, the amount of fuel shortage is calculated based on the difference between fuel pressure lowering and pressure lowering threshold to be attained if a desired amount of fuel is injected, and the fuel is injected from the intake manifold injector based on the amount of fuel shortage (for example, in an amount compensating for an amount of fuel shortage). In this manner, a desired amount of fuel can be supplied to the combustion chamber and a homogenous air-fuel mixture can be formed.

Preferably, the control device for an internal combustion engine further includes a temperature detection unit detecting a tip end temperature of the first fuel injection mechanism and a control stop unit stopping control by the corrective control unit when the tip end temperature is equal to or higher than a predetermined threshold temperature.

According to the present invention, when the tip end temperature of the in-cylinder injector is high, injection of fuel from the intake manifold injector by an amount of fuel shortage under the control of the corrective control unit is stopped and a desired amount of fuel is injected from the in-cylinder injector. In this manner, the tip end temperature of the in-cylinder injector can be lowered by the fuel. In other words, when the tip end temperature of the in-cylinder injector is high, it is not that the amount requested in the in-cylinder injector is reduced by raising an injection ratio of the intake manifold injector from next fuel injection for such a reason that sufficient fuel is not injected from the in-cylinder injector, but that output to the in-cylinder injector of an instruction to inject the fuel in an amount in accordance with the injection ratio is continued, so as not to positively decrease the fuel injected from the in-cylinder injector.

Preferably, the temperature detection unit detects the tip end temperature of the first fuel injection mechanism by estimation based on an operation state of the internal combustion engine.

According to the present invention, for example, a map is determined in advance based on an engine speed, a load factor, or an injection ratio each representing the operation state of the internal combustion engine, and the tip end temperature of the in-cylinder injector can be estimated based on such a map.

Preferably, the internal combustion engine is mounted on a vehicle, and the vehicle incorporates an automatic transmission including a fluid coupling having a mechanically engaged engagement mechanism. The control device further includes an engaged state detection unit detecting an engaged state of the engagement mechanism and a control stop unit stopping control by the corrective control unit when the engagement mechanism is not engaged.

According to the present invention, when spread of the spray formed by the fuel injected from the in-cylinder injector is small, homogeneity of the air-fuel mixture is lowered and drivability is deteriorated. When the lock-up clutch is not engaged, however, such deterioration in drivability is less likely to transmit to a driver. Accordingly, priority is placed on lowering the tip end temperature of the in-cylinder injector, and injection of fuel from the intake manifold injector in an amount comparable to fuel shortage under the control of the corrective control unit is stopped, so as to inject a desired amount of fuel from the in-cylinder injector. In other words, when the lock-up clutch is not engaged, it is not that the amount requested in the in-cylinder injector is reduced by raising an injection ratio of the intake manifold injector from next fuel injection for such a reason that sufficient fuel is not injected from the in-cylinder injector, but that output to the in-cylinder injector of an instruction to inject the fuel in an amount in accordance with the injection ratio is continued, so as not to positively decrease the fuel injected from the in-cylinder injector.

Preferably, the first fuel injection mechanism is an in-cylinder injector, and the second fuel injection mechanism is an intake manifold injector.

According to the present invention, in the internal combustion engine in which the in-cylinder injector serving as the fuel injection mechanism for injecting the fuel into the cylinder and the intake manifold injector for injecting the fuel into the intake manifold are separately provided to inject the fuel, a problem with regard to fuel injection from the first fuel injection mechanism can be solved, without lowering performance of the internal combustion engine.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic diagram showing an overall fuel supply mechanism in the engine system in FIG. 1.

DESCRIPTION OF THE PREFERRED EMBODIMENTS

Figure 1:
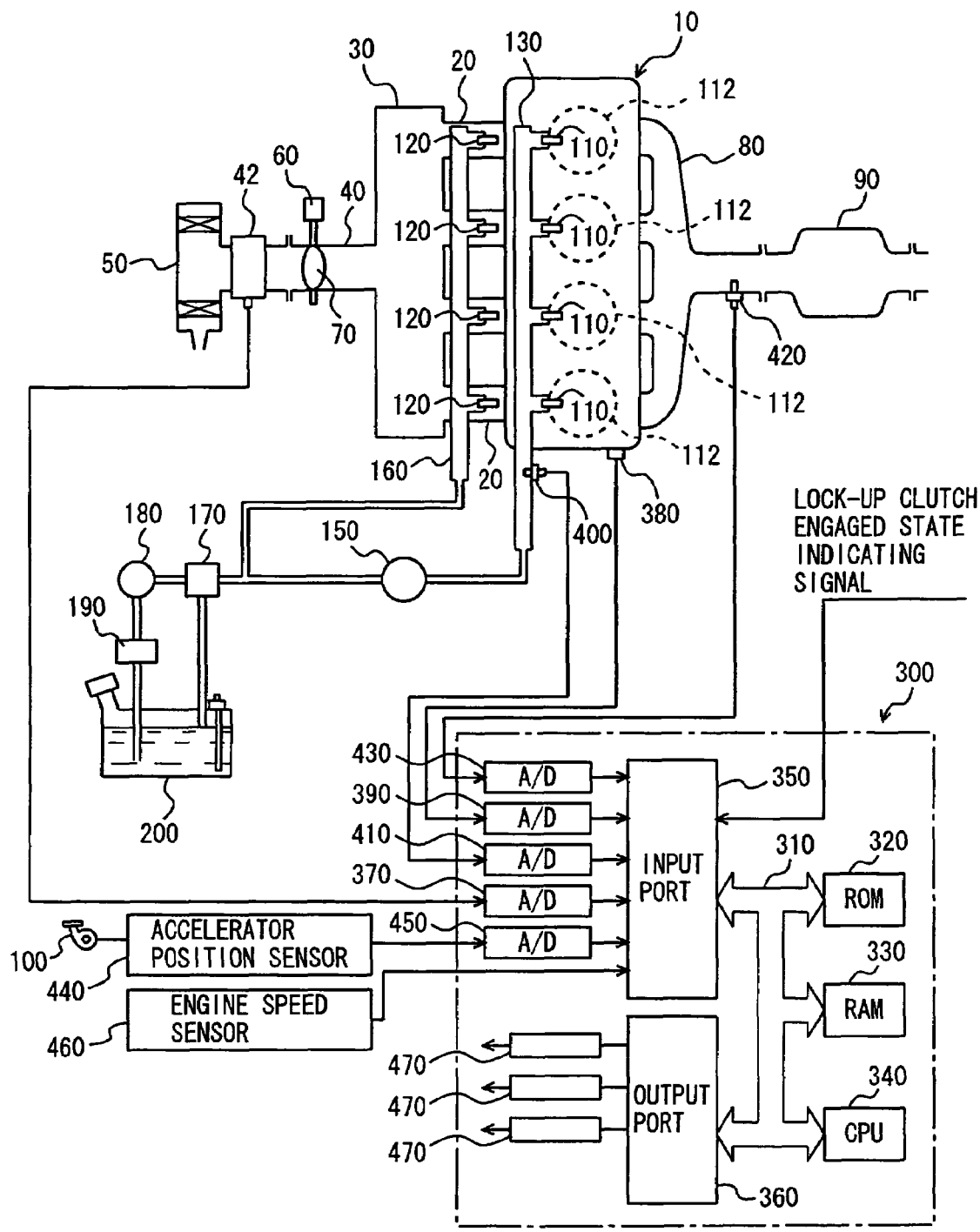
FIG. 1 is a schematic configuration diagram of an engine system controlled by a control device according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 schematically shows a configuration of an engine system controlled by an engine ECU (Electronic Control Unit) that is a control device of an internal combustion engine according to an embodiment of the present invention. Although an in-line 4-cylinder gasoline engine is shown in FIG. 1, application of the present invention is not restricted to the engine shown, and the present invention is applicable to a V-type 6-cylinder engine, a V-type 8-cylinder engine and an in-line 6-cylinder engine. The present invention is applicable to any engine at least having an in-cylinder injector and an intake manifold injector for each cylinder.

As shown in FIG. 1, an engine 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its position controlled based on an output signal of an engine ECU (Electronic Control Unit) 300, independently of an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided. These injectors 110, 120 are controlled based on output signals of engine ECU 300. In-cylinder injectors 110 are connected to a common fuel delivery pipe 130. Fuel delivery pipe 130 is connected to a high-pressure fuel delivery apparatus 150 of an engine driven type via a check valve 140 that allows flow toward fuel delivery pipe 130. In the present embodiment, description will be made as to the internal combustion engine having two injectors provided separately, although the present invention is not limited thereto. For example, the internal combustion engine may have a single injector capable of performing both in-cylinder injection and intake manifold injection.

As shown in FIG. 1, the discharge side of high-pressure fuel delivery apparatus 150 is connected to the intake side of high-pressure fuel delivery apparatus 150 via an electromagnetic spill valve. It is configured such that the quantity of the fuel supplied from high-pressure fuel delivery apparatus 150 to fuel delivery pipe 130 increases as the degree of opening of the electromagnetic spill valve is smaller, and that fuel supply from high-pressure fuel delivery apparatus 150 to fuel delivery pipe 130 is stopped when the electromagnetic spill valve is fully opened. The electromagnetic spill valve is controlled based on an output signal of engine ECU 300, and detailed description thereof will be provided later.

Meanwhile, intake manifold injectors 120 are connected to a common fuel delivery pipe 160 on the low-pressure side. Fuel delivery pipe 160 and high-pressure fuel delivery apparatus 150 are connected to a low-pressure fuel pump 180 of an electric motor driven type via a common fuel pressure regulator 170. Further, low-pressure fuel pump 180 is connected to a fuel tank 200 via a fuel filter 190. Fuel pressure regulator 170 is configured to return a part of the fuel discharged from low-pressure fuel pump 180 to fuel tank 200 when the pressure of the fuel discharged from low-pressure fuel pump 180 becomes higher than a preset fuel pressure. This prevents the pressure of the fuel supplied to intake manifold injectors 120 as well as the pressure of the fuel supplied to high-pressure fuel delivery apparatus 150 from becoming higher than the preset fuel pressure.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to fuel delivery pipe 130, which generates an output voltage proportional to a fuel pressure in fuel delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage proportional to an oxygen concentration in the exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an $O_2$ sensor may be used which detects, in an on/off manner, whether the air-fuel ratio of the mixture burned in engine 10 is rich or lean with respect to a stoichiometric air-fuel ratio.

Accelerator pedal 100 is connected to an accelerator position sensor 440 that generates an output voltage proportional to a degree of press-down of accelerator pedal 100. The output voltage of accelerator position sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection quantity that are set corresponding to operation states based on the engine load factor and the engine speed obtained by the above-described accelerator position sensor 440 and engine speed sensor 460, respectively, and the correction values based on the engine coolant temperature.

Referring to FIG. 2, a fuel supply mechanism of engine 10 described above will now be discussed. As shown in FIG. 2, this fuel supply mechanism includes a feed pump 1100 provided in fuel tank 200 for supplying fuel at a low discharge pressure (about 400 kPa corresponding to the pressure of a pressure regulator) (the same as low-pressure pump 180 in FIG. 1), a high-pressure fuel delivery apparatus 150 (a high-pressure fuel pump 1200) driven by a cam 1210, a high-pressure delivery pipe 1110 provided in order to supply high-pressure fuel to in-cylinder injector 110 (the same as fuel delivery pipe 130 in FIG. 1), in-cylinder injector 110 provided in high-pressure delivery pipe 1110 one for each cylinder, a low-pressure delivery pipe 1120 provided in order to supply fuel to intake manifold injector 120, and intake manifold injector 120 provided in low-pressure delivery pipe 1120 one for each intake manifold in each cylinder.

The discharge port of feed pump 1100 in fuel tank 200 is connected to a low-pressure supply pipe 1400, which is branched into a low-pressure delivery connection pipe 1410 and a pump supply pipe 1420. Low-pressure delivery connection pipe 1410 is connected to low-pressure delivery pipe 1120 provided with intake manifold injector 120.

Pump supply pipe 1420 is connected to an inlet port of high-pressure fuel pump 1200. A pulsation damper 1220 is provided immediately upstream of the inlet port of high-pressure fuel pump 1200 so as to reduce fuel pulsation.

The discharge port of high-pressure fuel pump 1200 is connected to a high-pressure delivery connection pipe 1500, which is connected to high-pressure delivery pipe 1110. A relief valve 1140 provided in high-pressure delivery pipe 1110 is connected via a high-pressure delivery return pipe 1610 to a high-pressure fuel pump return pipe 1600. The return port of high-pressure fuel pump 1200 is connected to high-pressure fuel pump return pipe 1600. High-pressure fuel pump return pipe 1600 is connected to a return pipe 1630, and then connected to fuel tank 200.

Figure 3:
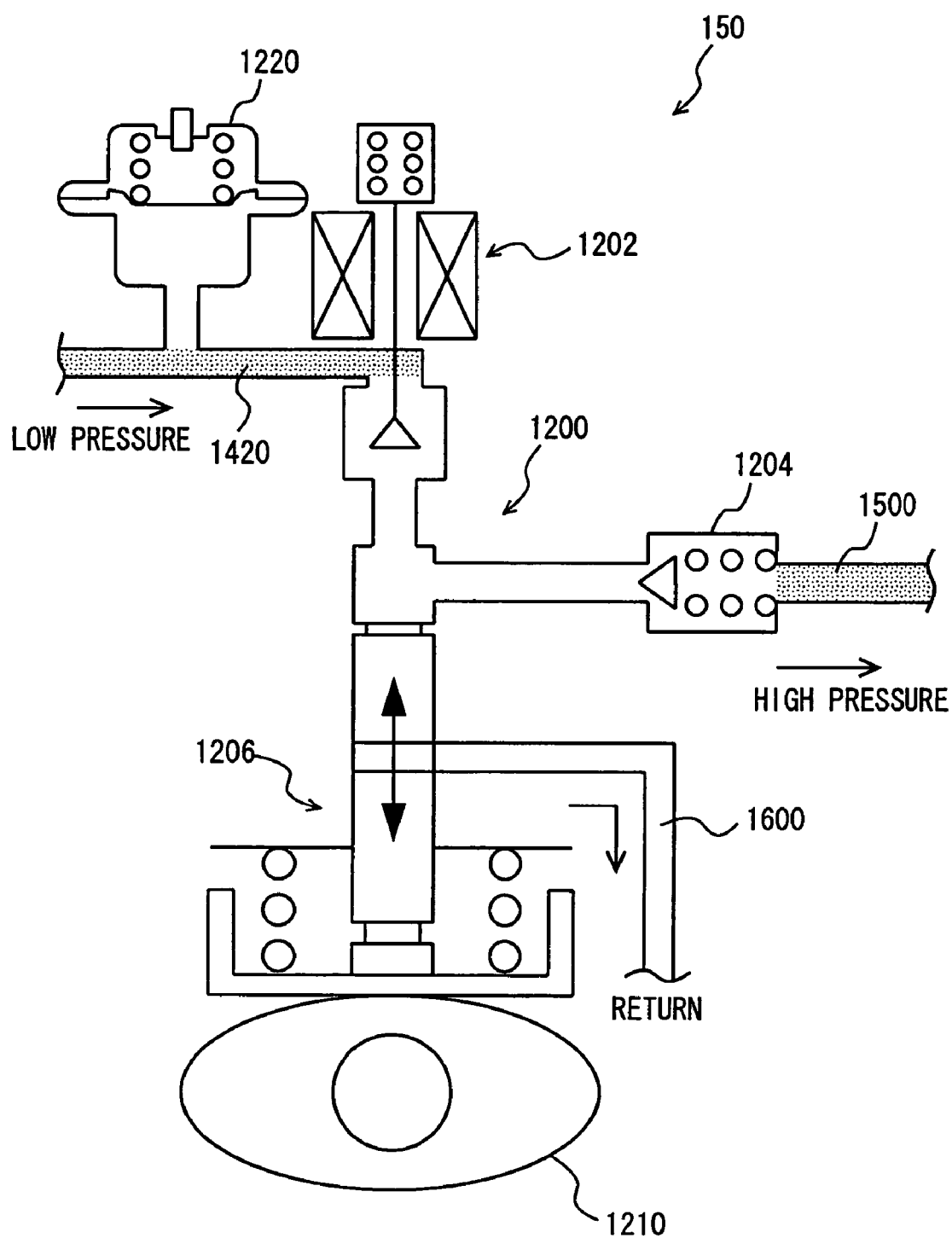
FIG. 3 is a partially enlarged view of FIG. 2.

FIG. 3 is an enlarged view of high-pressure fuel delivery apparatus 150 and its surroundings in FIG. 2. High-pressure fuel delivery apparatus 150 has, as its main components, high-pressure fuel pump 1200, a pump plunger 1206 driven by cam 1210 to slide up and down, an electromagnetic spill valve 1202, and a check valve 1204 provided with a leakage function.

When pump plunger 1206 is moved downward by cam 1210 and while electromagnetic spill valve 1202 is open, the fuel is introduced (suctioned). When pump plunger 1206 is moved upward by cam 1210, the timing to close electromagnetic spill valve 1202 is changed to control the amount of fuel discharged from high-pressure fuel pump 1200. During the pressurizing stroke in which pump plunger 1206 is moved upward, the fuel of a greater amount is discharged as the timing to close electromagnetic spill valve 1202 is earlier, whereas the fuel of a smaller amount is discharged as the timing to close the valve is later. The drive duty of electromagnetic spill valve 1202 when the greatest amount of fuel is discharged is set to 100%, and the drive duty of electromagnetic spill valve 1202 when the smallest amount of fuel is discharged is set to 0%. When the drive duty of electromagnetic spill valve 1202 is 0%, electromagnetic spill valve 1202 remains open, in which case, although pump plunger 1206 slides up and down as long as cam 1210 continues to rotate (along with rotation of engine 10), the fuel is not pressurized because electromagnetic spill valve 1202 does not close.

The pressurized fuel presses and opens check valve 1204 provided with the leakage function (of the set pressure of about 60 kPa), and the fuel is delivered via high-pressure delivery connection pipe 1500 to high-pressure delivery pipe 1110. At this time, the fuel pressure is controlled in a feedback manner by fuel pressure sensor 400 provided in high-pressure delivery pipe 1110.

In engine ECU 300 controlling engine 10 according to the present embodiment, fuel pressure sensor 400 monitors fluctuation in fuel pressure within high-pressure delivery pipe 1110. When deposits are accumulated in the injection hole of in-cylinder injector 110 and a desired amount of fuel cannot be injected, the fuel pressure within high-pressure delivery pipe 1110 does not become lower than a defined value. In such a case, as the amount of fuel requested in this cylinder is not satisfied, the fuel is injected from intake manifold injector 120 in this cylinder in an amount sufficient for compensating for fuel shortage.

Figure 4:
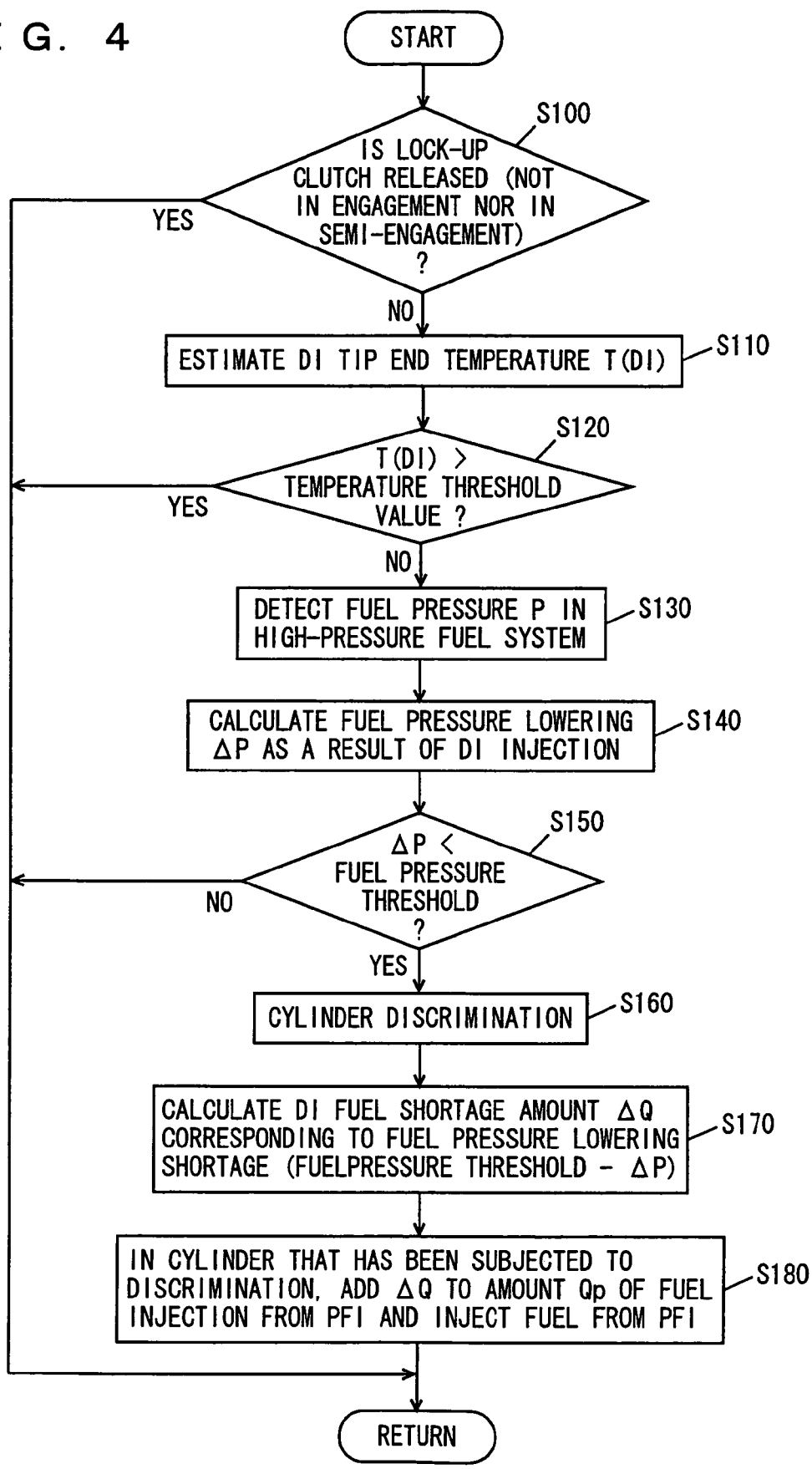
FIG. 4 is a flowchart showing a control configuration of a program executed in the control device according to the embodiment of the present invention.

Referring to FIG. 4, a control configuration of a program executed in engine ECU 300 serving as the control device according to the present embodiment will now be described. It is noted that the flowchart is repeatedly executed at an interval at which an amount of fuel injection in each cylinder can be changed.

At step (hereinafter, step is abbreviated as S) 100, engine ECU 300 determines whether or not the lock-up clutch is in a released state. Here, the released state of the lock-up clutch refers to such a state that the lock-up clutch is neither in an engaged state nor in a semi-engaged state (slip state). Such determination is made based on a lock-up clutch engaged state indicating signal input to engine ECU 300 from an ECT (Electronically Controlled Automatic Transmission)_ECU serving as a control device for the automatic transmission. When the lock-up clutch is in the released state (YES at S100), the process ends. Otherwise (NO at S100), the process proceeds to S110.

At S110, engine ECU 300 estimates a tip end temperature T(DI) of in-cylinder injector 110. Here, tip end temperature T(DI) of in-cylinder injector 110 is found based on a map prepared in advance, in which operation states of engine 10 (engine speed, load factor, and the like) are used as parameters.

At S120, engine ECU 300 determines whether or not tip end temperature T(DI) of in-cylinder injector 110 is higher than a temperature threshold value. When tip end temperature T(DI) of in-cylinder injector 110 is higher than the temperature threshold value (YES at S120), the process ends. Otherwise (NO at S120), the process proceeds to S130.

At S130, engine ECU 300 detects a fuel pressure P in the high-pressure fuel system based on a signal input from fuel pressure sensor 400. At S140, engine ECU 300 calculates fuel pressure lowering $\Delta P$ (>0) as a result of fuel injection from in-cylinder injector 110. When the fuel is normally injected from in-cylinder injector 110, the fuel pressure in high-pressure delivery pipe 1110 is lowered corresponding to the amount of injected fuel.

At S150, engine ECU 300 determines whether or not fuel pressure lowering ΔP as a result of fuel injection from in-cylinder injector 110 is smaller than a fuel pressure threshold. The fuel pressure threshold is set in correspondence with an amount of fuel pressure lowering within high-pressure delivery pipe 1110 achieved when a desired amount of fuel is injected from in-cylinder injector 110. The fuel pressure threshold may be calculated through calculation for each fuel injection based on the fuel pressure before injection and the amount of fuel injection (injection time period), or may be calculated based on the map associated in advance with the operation state of engine 10. When fuel pressure lowering ΔP as a result of fuel injection from in-cylinder injector 110 is smaller than the fuel pressure threshold (YES at S150), the process proceeds to S160. Otherwise (NO at S150), the process ends.

At S160, engine ECU 300 performs cylinder discrimination, to find out a cylinder in which the fuel pressure within high-pressure delivery pipe 1110 has been lowered solely by an amount smaller than the threshold (not so lowered). It is noted that the processing for cylinder discrimination may be performed at a step other than S160.

At S170, engine ECU 300 calculates an amount of fuel shortage ΔQ in in-cylinder injector 110 that corresponds to an amount of fuel pressure lowering shortage (the fuel pressure threshold—ΔP). Here, amount of fuel shortage ΔQ is calculated based on the fuel injection time period, the amount of fuel pressure lowering shortage and the like calculated by engine ECU 300.

At S180, engine ECU 300 adds ΔQ to an amount of fuel injection Qp from intake manifold injector 120 with regard to the discriminated cylinder, so that intake manifold injector 120 injects the fuel in the resultant amount.

An operation of engine 10 controlled by engine ECU 300 according to the present embodiment based on the configuration and the flowchart above will now be described.

When the lock-up clutch of a torque converter of the automatic transmission provided in the vehicle incorporating engine 10 is not released (in the engaged state or in the slip state and in such a state that vibration of engine 10 transmits to the driver through the torque converter) (NO at S100) and when estimated tip end temperature T(DI) of in-cylinder injector 110 is not higher than the temperature threshold value (NO at S120), fuel pressure P in the high-pressure fuel system is detected (S130). Here, as shown in FIGS. 5 and 6, after the fuel is injected from in-cylinder injector 110 and before next delivery from high-pressure pump 1200 is performed, the fuel pressure within high-pressure delivery pipe 1110 is lowered.

Figure 5:
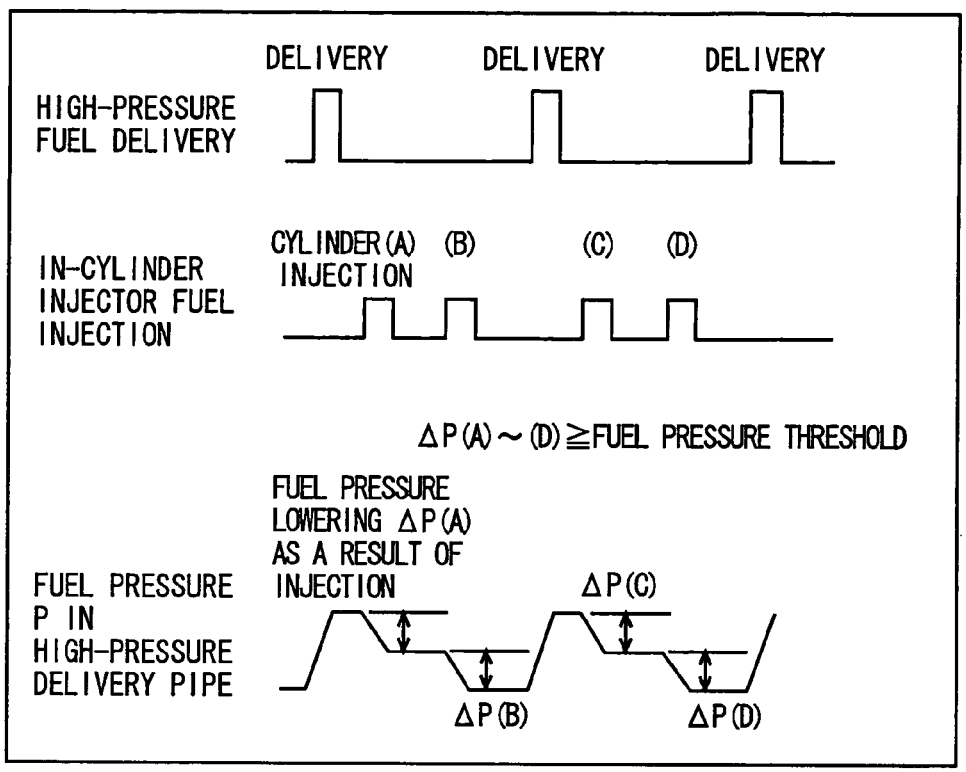
FIGS. 5–6 are timing charts showing variation in a fuel pressure in a high-pressure fuel system.
Figure 6:
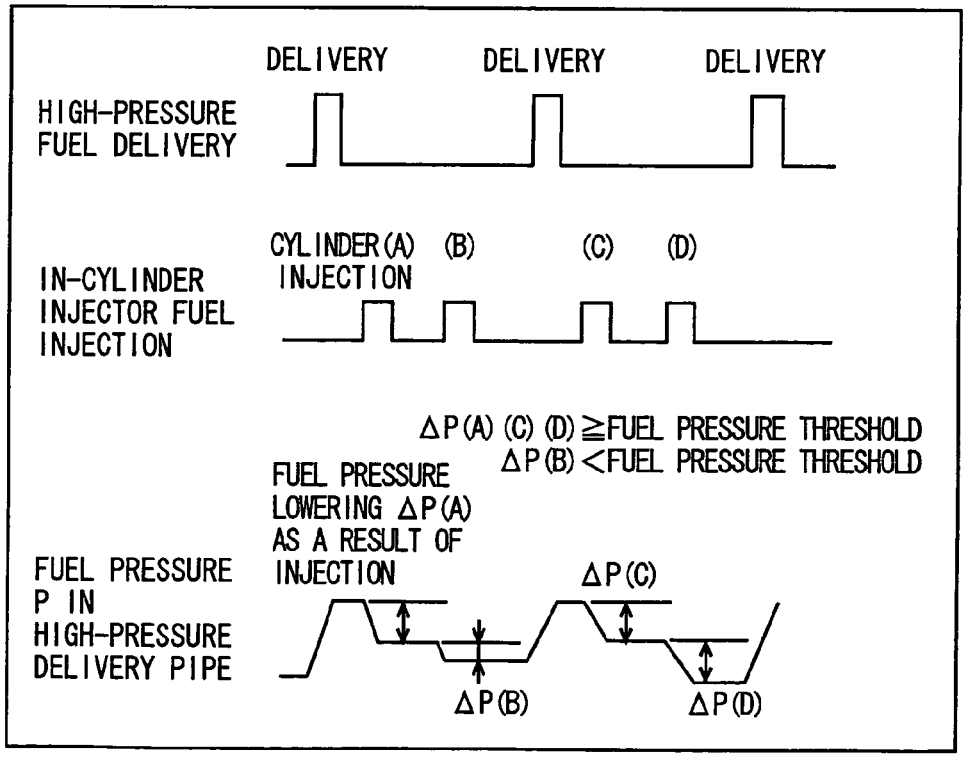

As shown in FIG. 5, if a defined amount of fuel is injected from in-cylinder injector 110, the fuel pressure is once lowered at least by an amount of the fuel pressure threshold (ΔP(A)–(D)≧fuel pressure threshold). On the other hand, if the amount of fuel injection from in-cylinder injector 110 is smaller than the defined amount, for example, due to accumulation of deposits in the injection hole at the tip end of in-cylinder injector 110, the fuel pressure is not lowered by the amount of fuel pressure threshold but remains high, as shown in FIG. 6. FIG. 6 shows an example in which deposits are formed in the injection hole at the tip end of in-cylinder injector 110 of cylinder B. When the injection hole of in-cylinder injector 110 of cylinder B is clogged or almost clogged due to the deposits, a desired amount of fuel cannot be injected even if a fuel injection instruction signal is supplied to in-cylinder injector 110 (exactly speaking, to an EDU (Electronic Driver Unit) serving as a controller for in-cylinder injector 110) for a prescribed injection time period. Accordingly, lowering in the fuel pressure in in-cylinder injector 110 is insufficient, as compared with a normal cylinder. Specifically, ΔP(B) is smaller than the fuel pressure threshold.

In such a case, fuel pressure lowering ΔP as a result of injection from in-cylinder injector 110 is calculated (S140), and it is detected with regard to cylinder B that ΔP(B) is smaller than the fuel pressure threshold (YES at S150). The example shown in FIG. 6 is determined as follows: as a result of cylinder discrimination, the fuel pressure within high-pressure delivery pipe 1110 was not lowered by the fuel pressure threshold, for a reason attributable to in-cylinder injector 110 in cylinder B.

When amount of fuel shortage ΔQ in in-cylinder injector 110 corresponding to the amount of fuel pressure lowering shortage (fuel pressure threshold—ΔP(B)) is calculated (S170), intake manifold injector 120 injects the fuel in an amount obtained by adding amount of fuel shortage ΔQ to the amount of fuel injected from intake manifold injector 120 in cylinder B.

It is assumed here that calculation of the amount of fuel injection is actually performed, for example, 540° CA before TDC in the compression stroke. Then, in a cycle determined at S150 that fuel pressure lowering is smaller than the threshold and the amount of fuel injected from in-cylinder injector 110 is smaller than the desired amount of fuel, it is difficult to correct, i.e., increase, the amount of fuel injected from intake manifold injector 120. Therefore, if this state (YES at S150) continues in a next cycle or later, the fuel is injected in an amount obtained by adding amount of fuel shortage ΔQ in in-cylinder injector 110 to the amount of fuel injected from intake manifold injector 120.

Such control is carried out so long as the fuel pressure fluctuates, and the amount of injection from in-cylinder injector 110 remains at the decreased level. Meanwhile, this is not preferable from a viewpoint of lowering the tip end temperature of in-cylinder injector 110. Therefore, control is carried out in the following manner.

When the lock-up clutch of the torque converter of the automatic transmission is released (YES at S100), it is not that shortage in the amount of fuel injected from in-cylinder injector 110 is compensated for by intake manifold injector 120 as described above. When the lock-up clutch is released, vibration of engine 10 transmits to the driver not through the lock-up clutch serving as a mechanical engagement element but through a working fluid (transmission oil) within the torque converter. Vibration of engine 10 is less likely to transmit through such a torque converter. Namely, even if the amount of fuel injected from in-cylinder injector 110 is small and homogeneity of the air-fuel mixture within the cylinder is lowered which leads to poorer drivability, the driver is less likely to feel such deterioration in drivability. Accordingly, when the lock-up clutch is released, shortage of fuel in in-cylinder injector 110 is not compensated for by intake manifold injector 120 as described above. In other words, it is not that shortage in the amount of fuel injection from in-cylinder injector 110 is naturally compensated for by intake manifold injector 120 (it is not that the amount of fuel injection of in-cylinder injector 110 (injection time period) is lowered), but that amount of fuel injection Qp from in-cylinder injector 110 calculated from the total fuel amount and DI ratio r is maintained. The fuel injected from in-cylinder injector 110 cools the injection hole at the tip end of in-cylinder injector 110 and can suppress generation of deposits. Therefore, preferably, output of the control signal is continued so as to inject a large amount of fuel from in-cylinder injector 110 while minimizing lowering in the amount of fuel injection from the same, so that the tip end temperature of in-cylinder injector 110 is lowered and generation of deposits is suppressed.

In addition, when tip end temperature T(DI) of in-cylinder injector 110 is higher than the temperature threshold value (YES at S120), shortage in the amount of fuel injected from in-cylinder injector 110 is not compensated for by intake manifold injector 120 as described above. When tip end temperature T(DI) of in-cylinder injector 110 is high, generation of deposits is likely in the injection hole at the tip end of in-cylinder injector 110. In order to suppress such generation of deposits, preferably, a large amount of fuel is injected from in-cylinder injector 110 while minimizing lowering in the amount of fuel injection from the same, so that the tip end temperature of in-cylinder injector 110 is lowered and generation of deposits is suppressed. In other words, it is not that shortage in the fuel injection amount from in-cylinder injector 110 is naturally compensated for by intake manifold injector 120 (it is not that the amount of fuel injection of in-cylinder injector 110 (injection time period) is lowered), but that amount of fuel injection Qp from in-cylinder injector 110 calculated from the total fuel amount and DI ratio r is maintained.

As described above, the engine controlled by the engine ECU according to the present embodiment includes the in-cylinder injector and the intake manifold injector for each cylinder. Fluctuation in the fuel pressure in the high-pressure delivery pipe for supplying the fuel to the in-cylinder injector is detected. When the fuel pressure is not lowered to the level that should be attained as a result of fuel injection from the in-cylinder injector, it is determined that normal fuel injection was not performed, for example, due to generation of deposits in the injection hole at the tip end of the in-cylinder injector in the corresponding cylinder. The amount of fuel shortage is calculated, for example, based on variation in the fuel pressure, and the amount of fuel shortage in the in-cylinder injector is compensated for by the intake manifold injector in that cylinder. Consequently, the problem with regard to fuel injection from the in-cylinder injector can be solved, without lowering performance of the engine.

The processing at S100 and S120 is optional, and one of the same may not be performed or none of the same may be performed.

<Engine (1) to Which Present Control Device is Suitably Adapted>

An engine (1) to which the control device of the present embodiment is suitably adapted will now be described.

Figure 7:
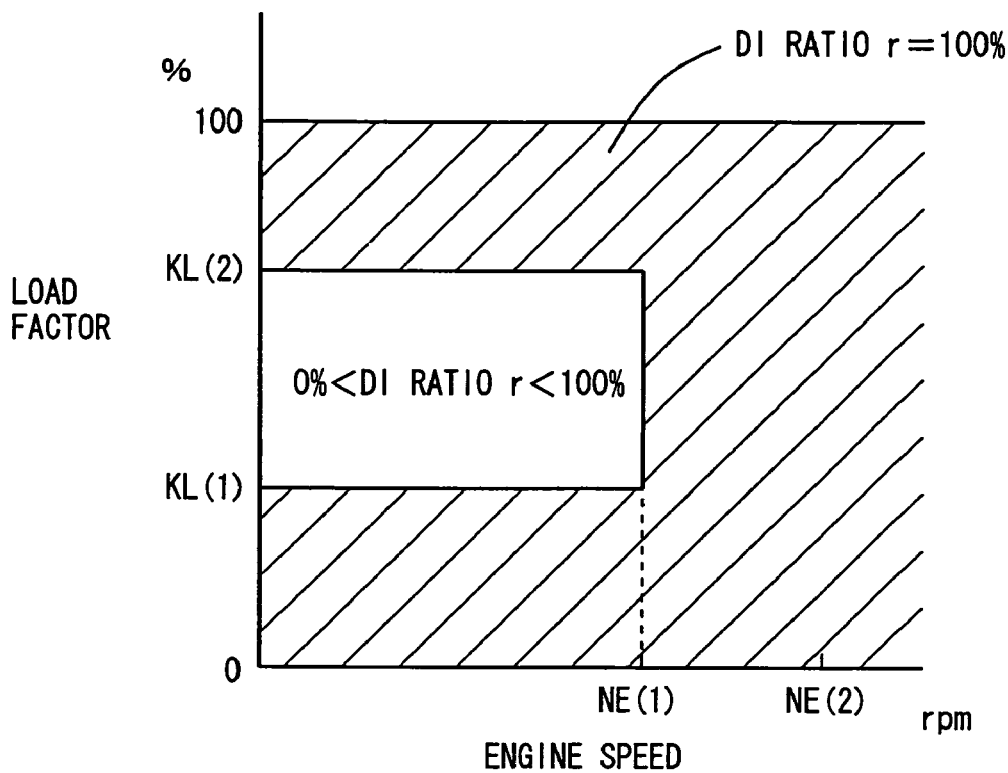
FIGS. 7 and 8 illustrate a first example of DI ratio maps in a warm state and a cold state respectively, of an engine to which the control device according to the embodiment of the present invention is suitably adapted.
Figure 8:
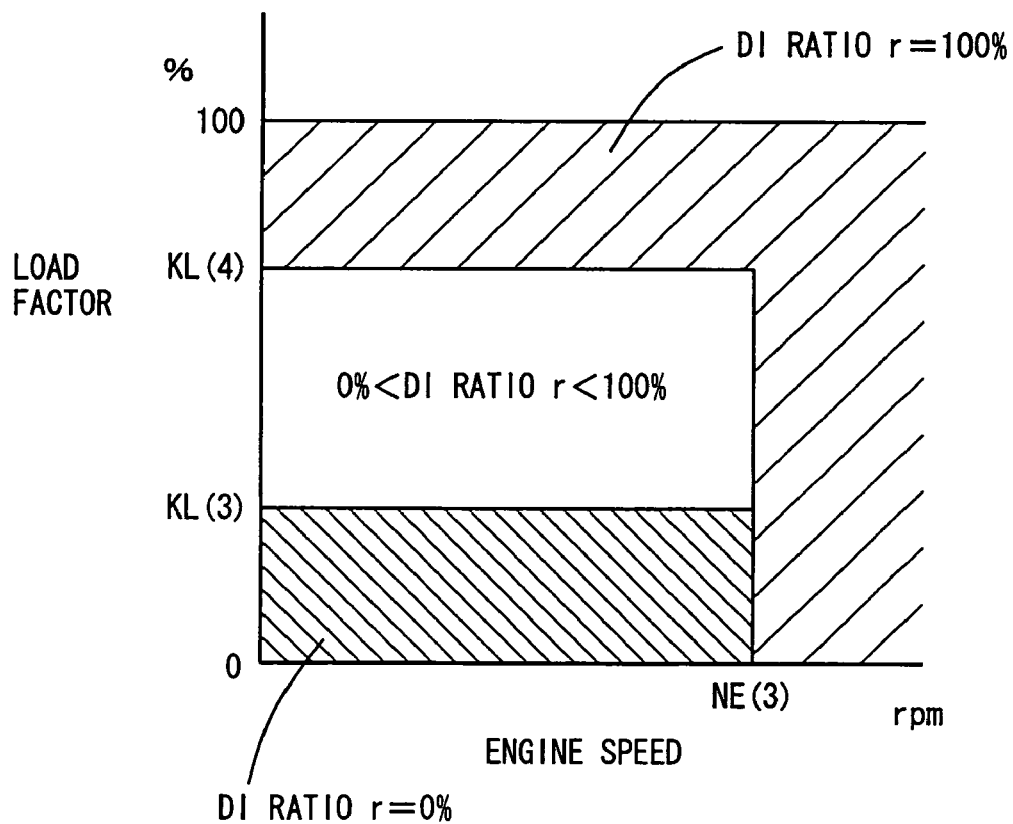

Referring to FIGS. 7 and 8, maps each indicating a fuel injection ratio between in-cylinder injector 110 and intake manifold injector 120 (hereinafter, also referred to as a DI ratio (r)), identified as information associated with an operation state of engine 10, will now be described. The maps are stored in ROM 320 of engine ECU 300. FIG. 7 is the map for a warm state of engine 10, and FIG. 8 is the map for a cold state of engine 10.

In the maps illustrated in FIGS. 7 and 8, with the horizontal axis representing an engine speed of engine 10 and the vertical axis representing a load factor, the fuel injection ratio of in-cylinder injector 110, or the DI ratio r, is expressed in percentage.

As shown in FIGS. 7 and 8, the DI ratio r is set for each operation region that is determined by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling).

Further, as shown in FIGS. 7 and 8, the fuel injection ratio between in-cylinder injector 110 and intake manifold injector 120, or the DI ratio r, is defined individually in the map for the warm state and in the map for the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 7 is selected; otherwise, the map for the cold state shown in FIG. 8 is selected. One or both of in-cylinder injector 110 and intake manifold injector 120 are controlled based on the selected map and according to the engine speed and the load factor of engine 10.

The engine speed and the load factor of engine 10 set in FIGS. 7 and 8 will now be described. In FIG. 7, NE(1) is set to 2500 rpm to 2700 rpm, KL(1) is set to 30% to 50%, and KL(2) is set to 60% to 90%. In FIG. 8, NE(3) is set to 2900 rpm to 3100 rpm. That is, NE(1)<NE(3). NE(2) in FIG. 7 as well as KL(3) and KL(4) in FIG. 8 are also set as appropriate.

When comparing FIG. 7 and FIG. 8, NE(3) of the map for the cold state shown in FIG. 8 is greater than NE(1) of the map for the warm state shown in FIG. 7. This shows that, as the temperature of engine 10 is lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 7 and FIG. 8, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 solely is used in the region of a predetermined high engine speed, and in the region of a predetermined high engine load. That is, in the high speed region or the high load region, even if fuel injection is carried out using only in-cylinder injector 110, the engine speed and the load of engine 10 are high, ensuring a sufficient intake air quantity, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 7, fuel injection is carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant region.

When comparing FIG. 7 and FIG. 8, there is a region of "DI RATIO r=0%" only in the map for the cold state in FIG. 8. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high output using in-cylinder injector 110 is unnecessary. Accordingly, fuel injection is carried out using only intake manifold injector 120, rather than in-cylinder injector 110, in the relevant region.

Further, in an operation other than the normal operation, or in the catalyst warm-up state during idling of engine 10 (abnormal operation state), in-cylinder injector 110 is controlled to carry out stratified charge combustion. By causing the stratified charge combustion only during the catalyst warm-up operation, warming up of the catalyst is promoted, and exhaust emission is thus improved.

<Engine (2) to Which Present Control Device is Suitably Adapted>

Hereinafter, an engine (2) to which the control device of the present embodiment is suitably adapted will be described. In the following description of the engine (2), the configurations similar to those of the engine (1) will not be repeated.

Figure 9:
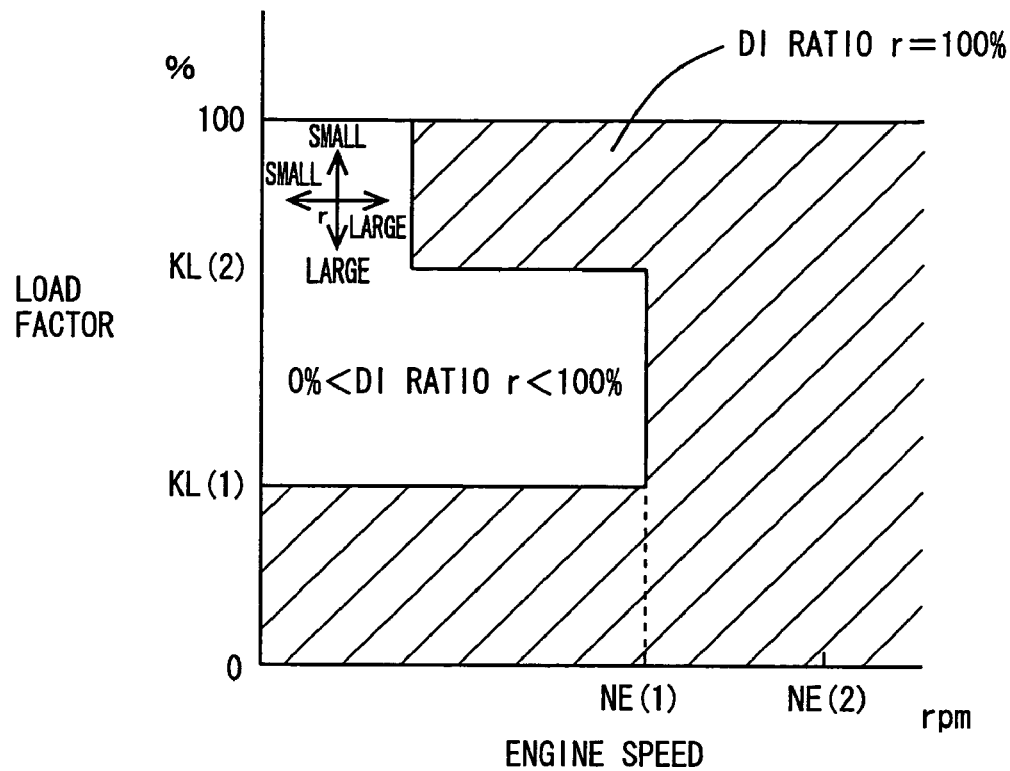
FIGS. 9 and 10 illustrate a second example of DI ratio maps in a warm state and a cold state respectively, of an engine to which the control device according to the embodiment of the present invention is suitably adapted.
Figure 10:
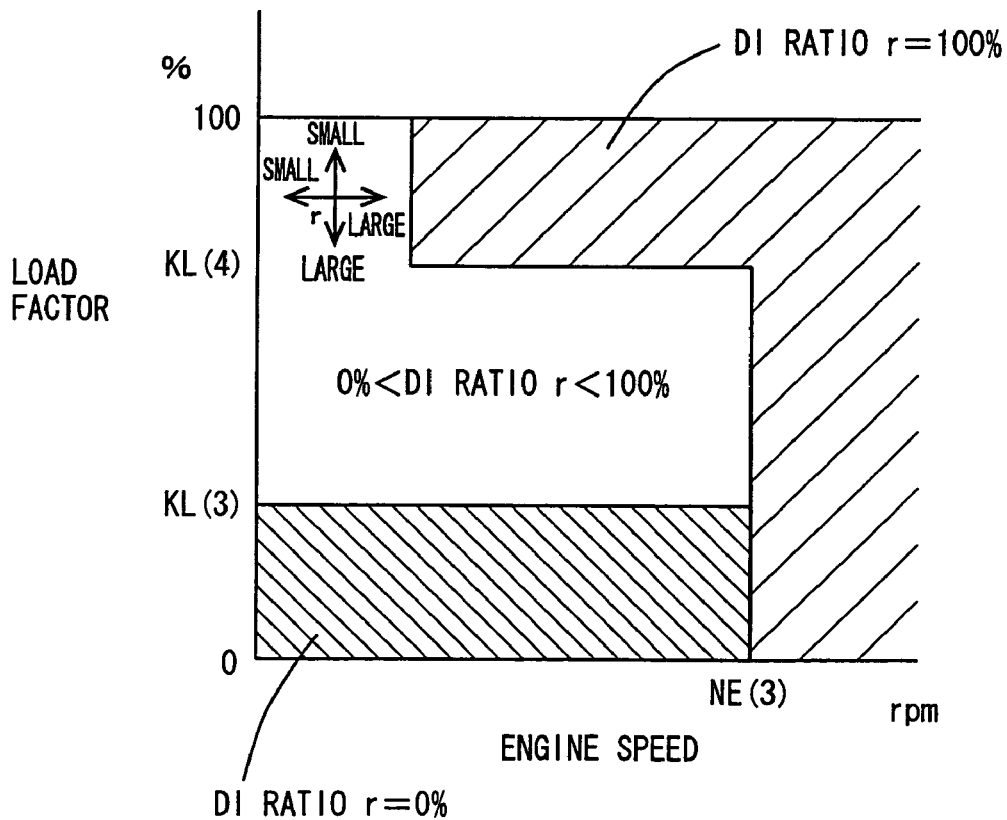

Referring to FIGS. 9 and 10, maps each indicating the fuel injection ratio between in-cylinder injector 110 and intake manifold injector 120, identified as information associated with the operation state of engine 10, will be described. The maps are stored in ROM 320 of engine ECU 300. FIG. 9 is the map for the warm state of engine 10, and FIG. 10 is the map for the cold state of engine 10.

FIGS. 9 and 10 differ from FIGS. 7 and 8 in the following points. "DI RATIO r=100%" holds in the region where the engine speed of engine 10 is equal to or higher than NE(1) in the map for the warm state, and in the region where engine 10 speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of the in-cylinder injector is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 9 and 10. In this manner, variation in output torque of the engine attributable to the unstable combustion can be suppressed. It is noted that these measures are approximately equivalent to the measures to decrease the fuel injection ratio of in-cylinder injector 110 as the state of engine 10 moves toward the predetermined low speed region, or to increase the fuel injection ratio of in-cylinder injector 110 as engine 10 state moves toward the predetermined low load region. Further, except for the relevant region (indicated by the crisscross arrows in FIGS. 9 and 10), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 10 is atomized within the combustion chamber involving latent heat of vaporization (by absorbing heat from the combustion chamber). Accordingly, the temperature of the air-fuel mixture is decreased at the compression end, and thus, the antiknock performance improves. Further, with the temperature of the combustion chamber decreased, intake efficiency improves, leading to high power output.

In engine 10 explained in conjunction with FIGS. 7–10, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 7–10, the fuel injection timing of in-cylinder injector 110 is preferably set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the sprayed fuel, so that the combustion rate increases. The improvement in antiknock performance and the increase in combustion rate can prevent variation in combustion, and thus, combustion stability is improved.

Regardless of the temperature of engine 10 (that is, whether engine 10 is in the warm state or in the cold state), the warm state map shown in FIG. 7 or 9 may be used during idle-off state (when an idle switch is off, or when the accelerator pedal is pressed) (regardless of whether engine 10 is in the cold state or in the warm state, in-cylinder injector 110 is used in the low load region).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for an internal combustion engine, said internal combustion engine including a first fuel injection mechanism injecting fuel into a cylinder and a second fuel injection mechanism injecting fuel into an intake manifold for each cylinder, comprising:
    a control unit controlling the fuel injection mechanism for each cylinder, such that the fuel is injected from said first fuel injection mechanism and said second fuel injection mechanism at a ratio set therebetween based on a condition requested in said internal combustion engine;
    a detection unit detecting for each cylinder that an amount of fuel injected from said first fuel injection mechanism is smaller than an amount requested in said first fuel injection mechanism; and
    a corrective control unit controlling said second fuel injection mechanism such that an amount of fuel injected from said second fuel injection mechanism in a cylinder in which the amount of injected fuel is lower than a requested amount is increased.

2. The control device for an internal combustion engine according to claim 1, wherein
    said detection unit detects a pressure of fuel supplied to said first fuel injection mechanism, and detects that the amount of injected fuel is smaller than the requested amount when an amount of pressure lowering as a result of fuel injection from said first fuel injection mechanism is smaller than a predetermined threshold.

3. The control device for an internal combustion engine according to claim 2, wherein
    said corrective control unit calculates an amount of fuel shortage representing a difference between the requested amount and the amount of fuel injected from said first fuel injection mechanism based on said threshold and said amount of pressure lowering, and increases an amount of fuel injection by adding the amount of fuel injected from said second fuel injection mechanism based on said amount of fuel shortage.

4. The control device for an internal combustion engine according to claim 1, further comprising:
    a temperature detection unit detecting a tip end temperature of said first fuel injection mechanism; and
    a control stop unit stopping control by said corrective control unit when said tip end temperature is equal to or higher than a predetermined threshold temperature.

5. The control device for an internal combustion engine according to claim 4, wherein
    said temperature detection unit detects the tip end temperature of said first fuel injection mechanism by estimation based on an operation state of said internal combustion engine.

6. The control device for an internal combustion engine according to claim 1, wherein
    said internal combustion engine is mounted on a vehicle,
    said vehicle incorporates an automatic transmission including a fluid coupling having a mechanically engaged engagement mechanism, and
    said control device further comprises
    an engaged state detection unit detecting an engaged state of said engagement mechanism, and
    a control stop unit stopping control by said corrective control unit when said engagement mechanism is not engaged.

7. The control device for an internal combustion engine according to claim 1, wherein
    said first fuel injection mechanism is an in-cylinder injector, and
    said second fuel injection mechanism is an intake manifold injector.

8. A control device for an internal combustion engine, said internal combustion engine including first fuel injection means for injecting fuel into a cylinder and second fuel injection means for injecting fuel into an intake manifold for each cylinder, comprising:
    control means for controlling the fuel injection means for each cylinder, such that the fuel is injected from said first fuel injection means and said second fuel injection means at a ratio set therebetween based on a condition requested in said internal combustion engine;
    detection means for detecting for each cylinder that an amount of fuel injected from said first fuel injection means is smaller than an amount requested in said first fuel injection means; and
    corrective control means for controlling said second fuel injection means such that an amount of fuel injected from said second fuel injection means in a cylinder in which the amount of injected fuel is smaller than a requested amount is increased.

9. The control device for an internal combustion engine according to claim 8, wherein
said detection means includes
means for detecting a pressure of fuel supplied to said first fuel injection mechanism, and
means for detecting that the amount of injected fuel is smaller than the requested amount when an amount of pressure lowering as a result of fuel injection from said first fuel injection means is smaller than a predetermined threshold.

10. The control device for an internal combustion engine according to claim 9, wherein
said corrective control means includes means for calculating an amount of fuel shortage representing a difference between the requested amount and the amount of fuel injected from said first fuel injection means based on said threshold and said amount of pressure lowering, and increasing an amount of fuel injection by adding the amount of fuel injected from said second fuel injection means based on said amount of fuel shortage.

11. The control device for an internal combustion engine according to claim 8, further comprising:
temperature detection means for detecting a tip end temperature of said first fuel injection means; and
means for stopping control by said corrective control means when said tip end temperature is equal to or higher than a predetermined threshold temperature.

12. The control device for an internal combustion engine according to claim 11, wherein
said temperature detection means includes means for detecting the tip end temperature of said first fuel injection means by estimation based on an operation state of said internal combustion engine.

13. The control device for an internal combustion engine according to claim 8, wherein
said internal combustion engine is mounted on a vehicle,
said vehicle incorporates an automatic transmission including a fluid coupling having a mechanically engaged engagement mechanism, and
said control device further comprises
means for detecting an engaged state of said engagement mechanism, and
means for stopping control by said corrective control means when said engagement mechanism is not engaged.

14. The control device for an internal combustion engine according to claim 8, wherein
said first fuel injection means is an in-cylinder injector, and
said second fuel injection means is an intake manifold injector.

* * * * *